United States Patent

Vanmaele et al.

Patent Number: 5,326,666
Date of Patent: Jul. 5, 1994

[54] DYE-DONOR ELEMENT FOR USE IN THERMAL DYE SUBLIMATION TRANSFER

[75] Inventors: Luc Vanmaele, Lochristi; Wilhelmus Janssens, Aarschot, both of Belgium

[73] Assignee: AGFA-Gevaert, N.V., Mortsel, Belgium

[21] Appl. No.: 40,610

[22] Filed: Mar. 31, 1993

[30] Foreign Application Priority Data

Apr. 21, 1992 [EP] European Pat. Off. ........ 92201111.9

[51] Int. Cl.⁵ .......................... G03C 5/54; G03C 1/72; G03C 5/16
[52] U.S. Cl. ..................... 430/201; 430/338; 430/944; 430/964; 430/522; 430/552; 8/471; 503/227
[58] Field of Search ............... 430/200, 201, 338, 964, 430/944; 503/227; 8/471

[56] References Cited

U.S. PATENT DOCUMENTS

| | | | |
|---|---|---|---|
| 4,829,047 | 5/1989 | Niwa et al. | 503/227 |
| 4,983,493 | 1/1991 | Nakamine et al. | 430/201 |
| 5,008,232 | 4/1991 | Tanaka et al. | 503/227 |
| 5,024,990 | 6/1991 | Chapman et al. | 430/200 |
| 5,026,679 | 6/1991 | Evans et al. | 430/201 |

Primary Examiner—Richard L. Schilling
Attorney, Agent, or Firm—Breiner & Breiner

[57] ABSTRACT

Dye-donor element for use according to thermal dye sublimation transfer, said dye-donor element comprising a support provided with a dye layer containing a dye dispersed in a polymeric binder, characterized in that said dye corresponds to the following formula (I)

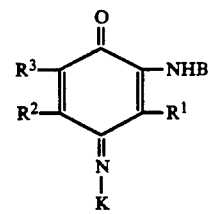

wherein
R¹, R² and R³ independently represent hydrogen, halogen, nitro, an alkyl group, a cycloalkyl group, an aryl group, an alkoxy group, an aryloxy group, a alkylthio group, a arylthio group, an acylamino group, a sulfamoyl group, a carbamoyl group, which groups may be substituted, or R² and R³ together can form a saturated or aromatic or heterocyclic ring fused-on the cyclohexadiene ring, which ring may be substituted;
B represents

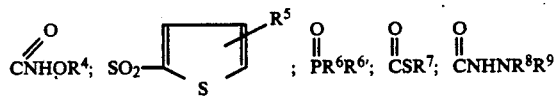

wherein $R^4$-$R^{11}$ are defined in the specification;
K represents

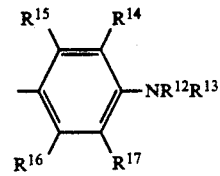

wherein:
$R^{12}$ and $R^{13}$ (independently) represent hydrogen, an alkyl group, an aryl group, a heterocyclic group, which groups may be substituted, or $R^{12}$ and $R^{13}$ together represent the necessary atoms to close a heterocyclic ring, which ring may be substituted, or $R^{12}$ and/or $R^{13}$ together with $R^{14}$ and/or $R^{17}$ represent the necessary atoms to close a ring fused-on the benzene ring, which ring may be substituted; $R^{14}$, $R^{15}$, $R^{16}$ and $R^{17}$ are defined in the specification.

7 Claims, No Drawings

DYE-DONOR ELEMENT FOR USE IN THERMAL DYE SUBLIMATION TRANSFER

DESCRIPTION

1. Field of the Invention

The present invention relates to cyan dye-donor elements and to IR-absorbing dye containing donor elements for use according to thermal dye sublimation transfer and more particularly to novel dyes for use in said dye-donor elements.

2. Background of the Invention

Thermal dye sublimation transfer, also called thermal dye diffusion transfer is a recording method in which a dye-donor element provided with a dye layer containing sublimable dyes having heat transferability is brought into contact with a receiver sheet and selectively, in accordance with a pattern information signal, heated with a thermal printing head provided with a plurality of juxtaposed heat-generating resistors, whereby dye from the selectively heated regions of the dye-donor element is transferred to the receiver sheet and forms a pattern thereon, the shape and density of which is in accordance with the pattern and intensity of heat applied to the dye-donor element.

A dye-donor element for use according to thermal dye sublimation transfer usually comprises a very thin support e.g. a polyester support, which may be coated on one or both sides with an adhesive or subbing layer, one adhesive or subbing layer being covered with a slipping layer that provides a lubricated surface against which the thermal printing head can pass without suffering abrasion, the other adhesive layer at the opposite side of the support being covered with a dye layer, which contains the printing dyes.

The dye layer can be a monochrome dye layer or it may comprise sequential repeating areas of different dyes like e.g. cyan, magenta and yellow dyes. When a dye-donor element containing three or more primary color dyes is used, a multicolor image can be obtained by sequentially performing the dye transfer process steps for each color.

Any dye can be used in such a dye layer provided it is easily transferable to the dye-image-receiving layer of the receiver sheet by the action of heat.

It is an object of the present invention to provide novel dyes which may be used in thermal dye sublimation transfer printing.

Other objects will become apparent from the description hereinafter.

SUMMARY OF THE INVENTION

According to the present invention dye-donor elements for use according to thermal dye sublimation transfer are provided, said dye-donor elements comprising a support provided with a dye layer containing a dye dispersed in a polymeric binder, said dye corresponding to the following formula (I)

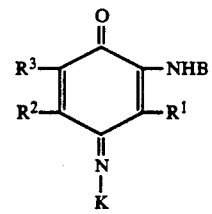

wherein
$R^1$, $R^2$ and $R^3$ independently represent hydrogen, halogen, nitro, an alkyl group, a cycloalkyl group, an aryl group, an alkoxy group, an aryloxy group, an alkylthio group, an arylthio group, an acylamino group, a sulfamoyl group, a carbomoyl group, which groups may be substituted, or $R^2$ and $R^3$ together can form a saturated or aromatic or heterocyclic ring fused-on the cyclohexadiene ring, which ring may be substituted:
B represents

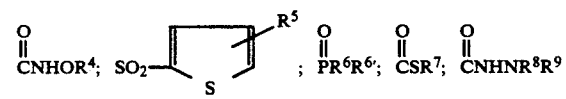

wherein
$R^4$ represents hydrogen, an alkyl group, a cycloalkyl group, an aryl group, which groups may be substituted, $SO_2R^{10}$, $COR^{10}$, $POR^{10}R^{11}$;
$R^5$ represents hydrogen, halogen, nitro, cyano, an alkyl group, an aryl group, an alkoxy group, a alkylthio group, which groups may be substituted;
$R^6$ and $R^{6'}$ independently represent an alkyl group, a cycloalkyl group, an alkenyl group, an aralkyl group, an aryl group, an alkoxy group, an aryloxy group, an alkylthio group, an arylthio group, an amino group or a heterocyclic group, which groups may be substituted, or $R^6$ and $R^{6'}$ together form a 5- or 6-membered ring, which ring may be substituted;
$R^7$ represents an alkyl group, an aryl group, a cycloalkyl group, which groups may be substituted;
$R^8$ and $R^9$ independently represent hydrogen, an alkyl group, an aryl group, a cycloalkyl group, which groups may be substituted, or $R^8$ and $R^9$ together can complete a heterocyclic ring, which ring may be substituted;
$R^{10}$ and $R^{11}$ independently represent an alkyl group, a cycloalkyl group, an alkenyl group, an aralkyl group, an aryl group, an alkoxy group, an aryloxy group, an alkylthio group, an arylthio group, an amino group or a heterocyclic group, which groups may be substituted, or $R^{10}$ and $R^{11}$ together form a 5- or 6-membered ring, which ring may be substituted.
K represents

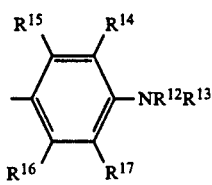

wherein:

$R^{12}$ and $R^{13}$ independently represent hydrogen, an alkyl group, an aryl group, a heterocyclic group, which groups may be substituted, or $R^{12}$ and $R^{13}$ together represent the necessary atoms to close a heterocyclic ring, which ring may be substituted, or $R^{12}$ and/or $R^{13}$ together with $R^{14}$ and/or $R^{17}$ represent the necessary atoms to close a ring fused-on the benzene ring, which ring may be substituted;

$R^{14}$, $R^{15}$, $R^{16}$ and $R^{17}$ independently represent hydrogen, hydroxy, halogen, an alkyl group, a cycloalkyl group, an aryl group, an alkyloxy group, an aryloxy group, a carbamoyl group, a sulfamoyl group, which groups may be substituted, $NH-SO_2R^{18}$, $NH-COR^{18}$, $O-SO_2R^{18}$, $O-COR^{18}$, or $R^{14}$ and $R^{15}$ together and/or $R^{16}$ and $R^{17}$ together represent the necessary atoms to close (a) ring(s) fused-on the benzene ring or $R^{14}$ and/or $R^{17}$ together with $R^{12}$ and/or $R^{13}$ represent the necessary atoms to close a heterocyclic ring fused-on the benzene ring, which groups may be substituted;

$R^{18}$ represents an alkyl group, a cycloalkyl group, an alkenyl group, an aralkyl group, an aryl group, an alkyloxy group, an aryloxy group, an alkylthio group, an arylthio group, an amino group, a heterocyclic group, which groups may be substituted.

DETAILED DESCRIPTION OF THE INVENTION

Preferably $R^1$ represents hydrogen, $R^2$ represents hydrogen or an alkyl group or alkylthio group or an alkylcarbamoyl group, $R^3$ represents hydrogen or halogen, $R^4$ represents an alkyl group, $R^5$ represents hydrogen, $R^6$ and $R^{6'}$ both represent an alkoxy group, $R^7$ represents an alkyl $R^8$ and $R^9$ together represent the necessary atoms to form a 6-membered ring, $R^{12}$ and $R^{13}$ both represent an alkyl group, $R^{14}$ represents hydrogen, $R^{15}$ represents hydrogen, an alkoxy or an alkyl group, $R^{16}$ represents hydrogen or an alkyl group and $R^{17}$ represents hydrogen.

Dyes included within the scope of the present invention include the following.

TABLE 1

| B | $R^1$ | $R^2$ | $R^3$ | $R^{12}$ | $R^{13}$ | $R^{14}$ | $R^{15}$ | $R^{16}$ | $R^{17}$ | No. |
|---|---|---|---|---|---|---|---|---|---|---|
| $SO_2$-thiophene | H | H | H | $C_2H_5$ | $C_2H_5$ | H | H | H | H | C1 |
| | H | $C_2H_5$ | Cl | $C_2H_5$ | $C_2H_5$ | H | H | H | H | C2 |
| | H | H | H | $C_2H_5$ | $C_2H_5$ | H | $CH_3$ | H | H | C3 |
| | H | $C_2H_5$ | Cl | $C_2H_5$ | $C_2H_5$ | H | $CH_3$ | H | H | C4 |
| | H | $CH_3$ | Cl | $C_2H_5$ | $C_2H_5$ | H | $CH_3$ | H | H | C5 |
| | H | $CH_3$ | Cl | $C_2H_5$ | $C_2H_5$ | H | H | H | H | C6 |
| | H | $NHCOCH_3$ | H | $C_2H_5$ | $C_2H_5$ | H | H | H | H | C7 |
| $\overset{O}{\underset{}{C}}SCH_3$ | H | H | H | $C_2H_5$ | $C_2H_5$ | H | H | H | H | C8 |
| | H | H | H | $C_2H_5$ | $C_2H_5$ | H | $CH_3$ | H | H | C9 |
| | H | $SCH_3$ | H | $C_2H_5$ | $C_2H_5$ | H | H | H | H | C10 |
| | H | $SCH_3$ | H | $C_2H_5$ | $C_2H_5$ | H | $CH_3$ | H | H | C11 |
| | H | $CH_3$ | H | $C_2H_5$ | $C_2H_5$ | H | $CH_3$ | H | H | C12 |
| $\overset{O}{\underset{}{C}}NHOCH_3$ | H | $C_2H_5$ | Cl | $C_2H_5$ | $C_2H_5$ | H | $CH_3$ | H | H | C13 |
| | H | $C_2H_5$ | Cl | $C_2H_5$ | $C_2H_5$ | H | H | H | H | C14 |
| | H | H | H | $C_2H_5$ | $C_2H_5$ | H | H | H | H | C15 |
| | H | H | H | $C_2H_5$ | $C_2H_5$ | H | $CH_3$ | H | H | C16 |

TABLE 1-continued

[Structure: quinone imine dye with substituents R1, R2, R3, NHB, and attached aniline ring with R12, R13, R14, R15, R16, R17]

| B | R1 | R2 | R3 | R12 | R13 | R14 | R15 | R16 | R17 | No. |
|---|---|---|---|---|---|---|---|---|---|---|
| O=C-NHN(piperidine) | H | H | H | C2H5 | C2H5 | H | H | H | H | C17 |
| | H | H | H | C2H5 | C2H5 | H | CH3 | H | H | C18 |
| | H | C2H5 | Cl | C2H5 | C2H5 | H | CH3 | H | H | C19 |
| | H | C2H5 | Cl | C2H5 | C2H5 | H | H | H | H | C20 |
| | H | H | H | C2H5 | C2H4OH | H | H | H | H | C21 |
| | H | CH3 | Cl | C2H5 | C2H5 | H | CH3 | H | H | C22 |
| O=P(OC6H5)2 | H | H | H | C2H5 | C2H5 | H | H | H | H | C23 |
| | H | C2H5 | Cl | C2H5 | C2H5 | H | H | H | H | C24 |
| | H | C2H5 | Cl | C2H5 | C2H5 | H | CH3 | H | H | C25 |
| SO2-(thiophene) | H | H | H | C4H9 | C4H9 | H | CH3 | CH3 | H | C26 |
| O=P(OC2H5)2 | H | H | H | C2H5 | C2H5 | H | CH3 | H | H | C27 |
| | H | H | H | C2H5 | C2H5 | H | H | H | H | C28 |
| | H | CH3 | Cl | C2H5 | C2H5 | H | H | H | H | C29 |
| | H | C2H5 | Cl | C2H5 | C2H5 | H | H | H | -H | C30 |
| | H | CH3 | Cl | C2H5 | C2H5 | H | CH3 | H | H | C31 |
| | H | C2H5 | Cl | C2H5 | C2H5 | H | CH3 | H | H | C32 |

In the above table C4H9 represents an n-butyl group.

Dyes according to the present invention can be obtained by the oxidative coupling method known in the art between p-phenylenediamine compounds or p-nitrosoaniline compounds and the appropriate phenols.

Representative examples of suitable p-phenylenediamine compounds are: 4-N,N-dimethylamino aniline, 4-N,N-diethylamino aniline, 4-(N-ethyl,N-hydroxyethyl)amino aniline, 4-(N-ethyl,N-cyanomethyl)amino aniline, 4-(N-ethyl,N-ethylsulfonic acid)amino aniline, 2-methyl,4-(N,N-dihydroxyethyl)amino aniline, 2-methyl,4-(N,N-diethylacetate)amino aniline, 2,6-dimethyl,4-(N,N-dihydroxyethyl)amino aniline, 2,3,5,6-tetramethyl-4-N,N-diethylamino aniline, 4-piperidino aniline, 4-morpholino aniline, 4-pyrrolidyl aniline, 4-imidazolo aniline.

Dyes according to general formula (I) above show a cyan hue. An advantage of these dyes is the possibility of obtaining more bathochromic absorbing and IR-absorbing dyes (e.g. dyes C2 en C4 with absorption maximum respectively 710 nm and 730 nm with high extinction coefficients, respectively $3,72.10^4$ and $4,18.10^4$ 1 mol$^{-1}$ cm$^{-1}$.

These dyes can be used as cyan image-forming dyes for silver halide color photographic materials by utilizing the above coupling reaction whereby the dye is imagewise formed according to the process of silver halide color photography. Also, these dyes are useful as cyan filter dyes for silver halide color photographic materials and also as antihalation dyes. Further after functionalization with hydrophilic groups these dyes can be used in inkjet printing.

According to a preferred embodiment of this invention these dyes are used as cyan dyes in the dye layer of a dye-donor element for thermal dye sublimation transfer.

These dyes can also be used as IR-absorbing dyes in the dye layer of a dye-donor element for laser induced thermal transfer, provided the absorption maximum is above 700 nm (for example dyes C2 and C4).

The dye layer of the dye-donor element is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed generally has a thickness of about 0.2 to 5.0 μm, preferably 0.4 to 2.0 μm, and the amount ratio of dye to binder is generally between 9:1 and 1:3 by weight, preferably between 2:1 and 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, nitrocellulose, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic.

The coating layer may also contain other additives, such as curing agents, preservatives, etc., these and other ingredients being described more fully in EP 133011, EP 133012, EP 111004 and EP 279467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include sheets or films of polyester such as polyethylene terephthalate, polyamide, polyacrylate, polycarbonate, cellulose ester, fluorinated polymer, polyether, polyacetal, polyolefin, polyimide, glassine paper and condenser paper. Preference is given to a support comprising polyethylene terephthalate. In general, the support has a thickness of 2 to 30 μm. The support may also be coated with an adhesive or subbing layer, if desired.

The dye layer of the dye-donor element may be coated on the support or printed thereon by a printing technique such as a gravure process.

A dye-barrier layer comprising a hydrophilic polymer may also be employed in the dye-donor element between its support and the dye layer to improve the dye transfer densities by preventing wrong-way transfer of dye towards the support. The dye barrier layer may contain any hydrophilic material which is useful for the intended purpose. In general, good results have been obtained with gelatin, polyacryl amide, polyisopropyl acrylamide, butyl methacrylate grafted gelatin, ethyl methacrylate grafted gelatin, ethyl acrylate grafted gelatin, cellulose monoacetate, methyl cellulose, polyvinyl alcohol, polyethylene imine, polyacrylic acid, a mixture of polyvinyl alcohol and polyvinyl acetate, a mixture of polyvinyl alcohol and polyacrylic acid or a mixture of cellulose monoacetate and polyacrylic acid. Suitable dye barrier layers have been described in e.g. EP 227091 and EP 228065. Certain hydrophilic polymers, for example those described in EP 227091, also have an adequate adhesion to the support and the dye layer, thus eliminating the need for a separate adhesive or subbing layer. These particular hydrophilic polymers used in a single layer in the donor element thus perform a dual function, hence are referred to as dye-barrier/-subbing layers.

Preferably the reverse side of the dye-donor element can be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. The surface active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$-$C_{20}$ aliphatic acids. Examples of liquid lubricants include silicone oils, synthetic oils, saturated hydrocarbons and glycols. Examples of solid lubricants include various higher alcohols such as stearyl alcohol, fatty acids, and fatty acid esters. Suitable slipping layers are described in e.g. EP 138483, EP 227090, U.S. Pat. Nos. 4,567,113, 4,572,860, 4,717,711.

The support for the receiver sheet that is used with the dye-donor element may be a transparant film of e.g. polyethylene terephthalate, a polyether sulfone, a polyimide, a cellulose ester or a polyvinyl alcohol-co-acetal. The support may also be a reflective one such as baryta-coated paper, polyethylene-coated paper or white polyester i.e. white-pigmented polyester.

To avoid poor adsorption of the transferred dye to the support of the receiver sheet this support must be coated with a special surface, a dye-image-receiving layer, into which the dye can diffuse more readily. The dye-image-receiving layer may comprise, for example, a polycarbonate, a polyurethane, a polyester, a polyamide, polyvinyl chloride, polystyrene-co-acrylonitrile, polycaprolactone or mixtures thereof. The dye-image receiving layer may also comprise a heat-cured product of poly(vinylchloride-co-vinylacetate-co-vinylalcohol. Suitable dye-receiving layers have been described in e.g. EP 133011, EP 133012, EP 144247, EP 227094, EP 228066.

In order to improve the light resistance and other stabilities of recorded images, UV absorbers, singlet oxygen quenchers such as HALS-compounds (Hindered Amine Light Stabilizers) and/or antioxidants may be incorporated into the receiving layer.

The dye layer of the dye-donor element or the dye-image-receiving layer of the receiver sheet may also contain a releasing agent that aids in separating the dye-donor element from the dye-receiving element after transfer. The releasing agents can also be applied in a separate layer on at least part of the dye layer or of the receiving layer. For the releasing agent solid waxes, fluorine- or phosphate-containing surfactants and silicone oils are used. Suitable releasing agents are described in e.g. EP 133012, JP 85/19138, EP 227092.

The dye-donor elements according to the invention are used to form a dye transfer image. Such a process comprises placing the dye layer of the donor element in face-to-face relation with the dye-receiving layer of the receiver sheet and imagewise heating from the back of the donor element. The transfer of the dye is accomplished e.g. by heating for about several milliseconds at a temperature of 400° C.

When the process is performed for but one single color, a monochrome cyan dye transfer image is obtained, which consists of at least one dye according to the present invention. A multicolor image can be obtained by using a donor element containing three or more primary color dyes, one of which consists of at least one cyan dye according to the present invention, and sequentially performing the process steps described above for each color. After the first dye has been transferred, the elements are peeled apart. A second dye-donor element (or another area of the donor element with a different dye area) is then brought in register with the dye-receiving element and the process is repeated. The third color and optionally further colors are obtained in the same manner.

In addition to thermal heads, laser light, infrared flash or heated pens can be used as the heat source for supplying heat energy. Thermal printing heads that can be used to transfer dye from the dye-donor elements of the present invention to a receiver sheet are commercially available. In case laser light is used (i.e. a method known as laser induced thermal transfer), the dye layer or another layer of the dye element has to contain a compound that absorbs the light emitted by the laser and converts it into heat, e.g. an IR-absorbing dye according to the present invention.

Alternatively, the support of the dye-donor element may be an electrically resistive ribbon consisting of, for example, a multi-layer structure of a carbon loaded polycarbonate coated with a thin aluminum film. Current is injected into the resistive ribbon by electrically addressing a print head electrode resulting in highly localized heating of the ribbon beneath the relevant electrode. The fact that in this case the heat is generated directly in the resistive ribbon and that it is thus the ribbon that gets hot leads to an inherent advantage in printing speed using the resistive ribbon/electrode head technology compared to the thermal head technology where the various elements of the thermal head get hot and must cool down before the head can move to the next printing position.

The following examples are provided to illustrate the invention in more detail without limiting, however, the scope thereof.

EXAMPLE 1

Synthesis of C2

An amount of 24.3 g (0.1 mole) of 2-amino-4,6-dichloro-5-ethylphenol monohydrochloride was dissolved in 20 ml of acetone and 16.6 ml of pyridine. The solution was stirred for 10 minutes. An amount of 18.3 g (1 equiv.) of thiophene-2-sulfochloride (prepared according to the description given in Bulletin of the Chemical Society of Japan, Vol. 58 (3), 1985, pages 1063-1064) was added dropwise at room temperature. The reaction proceeded exothermally and the reaction mixture was stirred for one hour. Then, the reaction mixture was extracted with ethyl acetate/water, washed with a saturated sodium chloride solution and dried over sodium sulphate. After filtration and concentration 35 g of compound (a) were obtained.

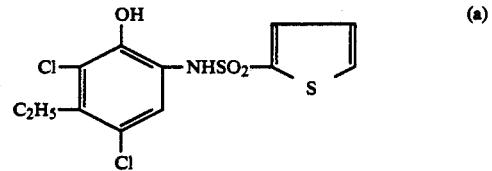

An amount of 14 g (0.04 mole) of compound (a) was dissolved in 20 ml of methanol (first solution). An amount of 8.8 g (1.1 equiv.) of N,N-diethyl-p-phenylenediamine monohydrochloride and 17 g (4 equiv.) of sodium carbonate were dissolved in 10 ml of methanol and 100 ml of water (second solution). An amount of 10.2 g (1 equiv.) of iodine was dissolved in 80 ml of methanol (third solution). The second solution was added to the first solution, followed by dropwise addition at room temperature of the third solution.

The reaction mixture was stirred for one hour, extracted with ethyl acetate, washed with water and dried over sodium sulphate. After filtration and concentration, the residue was purified by column chromatography (eluent: dichloromethane/ethyl acetate 96:4) to obtain 5 g of pure compound C2.

EXAMPLE 2

Synthesis of C8

46.5 g (1.05 equiv.) of CH₃SCOCl was added dropwise at room temperature and in a period of 30 minutes to a solution of 43.6 g (0.4 mole) of o-aminophenol in acetone (75 ml) and pyridine (44 ml). The reaction proceeded exothermally and the temperature raised to 62° C. After stirring for one hour the reaction mixture was extracted with water/ethyl acetate. The ethylacetate layer was washed with water and a saturated sodium chloride solution, dried over sodium sulphate and concentrated under reduced pressure. The residue was purified by column chromatography (eluent: dichloromethane/methanol 6:4). 45.2 g of compound (b) were obtained.

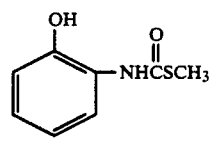

An amount of 22 g (0.12 mole) of compound (b) was dissolved in 20 ml of methanol (first solution). An amount of 51 g (4 equiv.) of sodium carbonate and 26 g (1.075 equiv.) of N,N-diethyl-p-phenylenediamine monohydrochloride were dissolved in 300 ml of water and 30 ml of methanol (second solution). An amount of 61 g (2 equiv.) of iodine was dissolved in 420 ml of methanol (third solution). The first solution was added to the second solution and stirred for 10 minutes. The third solution was added at once and the reaction mixture was stirred for 30 minutes. The reaction mixture was extracted with ethyl acetate, washed with water and dried over sodium sulphate. After filtration and concentration 25 g of compound C8 were obtained. Compound C8 was purified by column chromatography (eluent: dichloromethane).

EXAMPLE 3

The absorption maxima ($\lambda_{max}$) and molar extinction coefficients ($\epsilon$) of the dyes identified below were determined in methanol. The results are listed in table 2.

TABLE 2

| dye | $\lambda_{max}$ (nm) | $\epsilon$ (mol$^{-1}$ cm$^{-1}$ l) |
|---|---|---|
| C2 | 710 | 37202 |
| C3 | 661 | 24189 |
| C4 | 730 | 41826 |
| C5 | 694 | 28290 |
| C6 | 674 | 27732 |
| C8 | 637 | 26763 |
| C9 | 660 | 32654 |
| C10 | 648 | 23600 |
| C11 | 665 | 30248 |
| C27 | | |

EXAMPLE 4

A dye-donor element for use according to thermal dye sublimation transfer was prepared as follows:

A solution of dye, the nature and amount of which is identified in Table 3 below, and 50 mg of co-acrylonitrile-styrene binder in 10 ml of methylethylketone as solvent was prepared. From this solution a layer having a wet thickness of 100 μm was coated on 5 μm polyethylene terephthalate film. The resulting layer was dried by evaporation of the solvent.

A commercially available material supplied by MITSUBISHI, type CK 100 S or CK 100 TS as identified in table 3 below, was used as receiving element.

The dye-donor element was printed in combination with the receiving element in a color video printer supplied by MITSUBISHI, type CP 100 E.

The receiver sheet was separated from the dye-donor element and the maximum color density of the recorded dye image on the receiving sheet ($D_{max}$) was measured by means of a Macbeth TR 924 densitometer.

The results are listed in Table 3 below.

TABLE 3

| dye | mg | Density CK 100 S | CK 100 TS |
|---|---|---|---|
| C2 | 50 | | 1,16 |
| C3 | 50 | 2,56 | 1,30 |
| C4 | 50 | | 0,80 |
| C5 | 30 | | 0,57 |
| C6 | 30 | | 0,74 |
| C8 | 50 | 2,95 | 1,72 |
| C9 | 50 | 2,78 | |
|    | 30 | | 1,19 |
| C10 | 30 | | 0,82 |
| C11 | 30 | | 0,71 |
| C27 | 30 | | 0,79 |

We claim:

1. Dye-donor element for use according to thermal dye sublimation transfer, said dye-donor element comprising a support provided with a dye layer containing a dye dispersed in a polymeric binder, characterized in that said dye corresponds to the following formula (I)

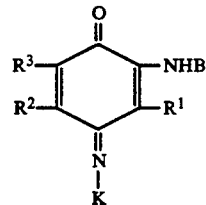

wherein $R^1$, $R^2$ and $R^3$ independently represent hydrogen, an alkyl group, a cycloalkyl group, an aryl group, an alkoxy group, an aryloxy group, a alkylthio group, a arylthio group, an acylamino group, a sulfamoyl group, a carbamoyl group, which groups may be substituted, or $R^2$ and $R^3$ together can form a saturated or aromatic or heterocyclic ring fused-on the cyclohexadiene ring, which ring may be substituted;

B represents

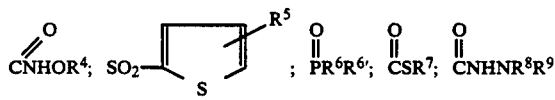

wherein $R^4$ represents hydrogen, an alkyl group, a cycloalkyl group, an aryl group, which groups may be substituted, $SO_2R^{10}$, $COR^{10}$, $POR^{10}R^{11}$;

$R^5$ represents hydrogen, halogen, nitro, cyano, an alkyl group, an aryl group, an alkoxy group, an alkylthio group, which groups may be substituted;

$R^6$ and $R^{6'}$ independently represent an alkyl group, a cycloalkyl group, an alkenyl group, an aralkyl group, an aryl group, an alkoxy group, an aryloxy group, an alkylthio group, an arylthio group, an amino group or a heterocyclic group, which groups may be substituted, or $R^6$ and $R^{6'}$ together form a 5- or 6-membered ring, which ring may be substituted;

$R^7$ represents an alkyl group, an aryl group, a cycloalkyl group, which groups may be substituted;

$R^8$ and $R^9$ independently represent hydrogen, an alkyl group, an aryl group, a cycloalkyl group, which groups may be substituted, or $R^8$ and $R^9$ together can form a heterocyclic ring, which ring may be substituted;

$R^{10}$ and $R^{11}$ independently represent an alkyl group, a cycloalkyl group, an alkenyl group, an aralkyl group, an aryl group, an alkoxy group, an aryloxy group, an alkylthio group, an arylthio group, an amino group or a heterocyclic group, which groups may be substituted, or $R^{10}$ and $R^{11}$ together form a 5- or 6-membered ring, which ring may be substituted;

K represents

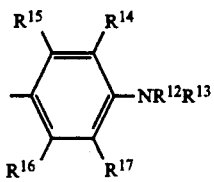

wherein:

R¹² and R¹³ independently represent hydrogen, an alkyl group, an aryl group, a heterocyclic group, which groups may be substituted, or R¹² and R¹³ together represent the necessary atoms to close a heterocyclic ring, which ring may be substituted, or R¹² and/or R¹³ together with R¹⁴ and/or R¹⁷ represent the necessary atoms to close a ring fused-on the benzene ring, which ring may be substituted;

R¹⁴, R¹⁵, R¹⁶ and R¹⁷ independently represent hydrogen, hydroxy, halogen, an alkyl group, a cycloalkyl group, an aryl group, an alkyloxy group, an aryloxy group, a carbamoyl group, a sulfamoyl group, which groups may be substituted, NH-SO₂R¹⁸, NH-COR¹⁸, O-SO₂R¹⁸, O-COR¹⁸, or R¹⁴ and R¹⁵ together and/or R¹⁶ and R¹⁷ together represent the necessary atoms to close (a) ring(s) fused-on the benzene ring or R¹⁴ and/or R¹⁷ together with R¹² and/or R¹³ represent the necessary atoms to close a heterocyclic ring fused-on the benzene ring, which groups may be substituted;

R¹⁸ represents an alkyl group, a cycloalkyl group, an alkenyl group, an aralkyl group, an aryl group, an alkyloxy group, an aryloxy group, an alkylthio group, an arylthio group, an amino group, a heterocyclic group, which groups may be substituted.

2. Dye-donor element according to claim 1, wherein R¹ represents hydrogen, R² represents hydrogen or an alkyl group or an alkylcarbamoyl group, R³ represents hydrogen or halogen, R⁴ represents an alkyl group, R⁵ represents hydrogen, R⁶ and R⁶' both represent an alkoxy group, R⁷ represents an alkyl group, R⁸ and R⁹ together represent the necessary atoms to form a 6-membered ring, R¹² and R¹³ both represent an alkyl group, R¹⁴ represents hydrogen, R¹⁵ represents hydrogen or an alkyl group, R¹⁶ represents hydrogen or an alkyl group and R¹⁷ represents hydrogen.

3. Dye-donor element according to claim 1, wherein the dye has an absorption maximum above 700 nm.

4. Dye-donor element according to claim 1, wherein the binder is costyrene-acrylonitrile.

5. Dye-donor element according to claim 1, wherein the support is polyethylene terephthalate.

6. Thermal dye sublimation transfer method comprising the step of imagewise heating a dye donor element in face-to-face relation with a receiving element, said donor element comprising a support provided with a dye layer containing a dye dispersed in a polymeric binder, characterized in that said dye corresponds to the following formula (I)

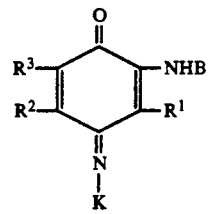

wherein

R¹, R² and R³ independently represent hydrogen, halogen, nitro, an alkyl group, a cycloalkyl group, an aryl group, an alkoxy group, an aryloxy group, a alkylthio group, a arylthio group, an acylamino group, a sulfamoyl group, a carbamoyl group, which groups may be substituted, or R² and R³ together can form a saturated or aromatic or heterocyclic ring fused-on the cyclohexadiene ring, which ring may be substituted;

B represents

wherein

R⁴ represents hydrogen, an alkyl group, a cycloalkyl group, an aryl group, which groups may be substituted, SO₂R¹⁰, COR¹⁰, POR¹⁰R¹¹;

R⁵ represents hydrogen, halogen, nitro, cyano, an alkyl group, an aryl group, an alkoxy group, an alkylthio group, which groups may be substituted;

R⁶ and R⁶' independently represent an alkyl group, a cycloalkyl group, an alkenyl group, an aralkyl group, an aryl group, an alkoxy group, an aryloxy group, an alkylthio group, an arylthio group, an amino group or a heterocyclic group, which groups may be substituted, or R⁶ and R⁶' together form a 5- or 6-membered ring, which ring may be substituted;

R⁷ represents an alkyl group, an aryl group, a cycloalkyl group, which groups may be substituted;

R⁸ and R⁹ independently represent hydrogen, an alkyl group, an aryl group, a cycloalkyl group, which groups may be substituted, or R⁸ and R⁹ together can form a heterocyclic ring, which ring may be substituted;

R¹⁰ and R¹¹ independently represent an alkyl group, a cycloalkyl group, an alkenyl group, an aralkyl group, an aryl group, an alkoxy group, an aryloxy group, an alkylthio group, an arylthio group, an amino group or a heterocyclic group, which groups may be substituted, or R¹⁰ and R¹¹ together form a 5- or 6-membered ring, which ring may be substituted;

K represents

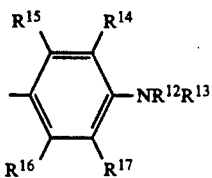

wherein:

$R^{12}$ and $R^{13}$ (independently) represent hydrogen, an alkyl group, an aryl group, a heterocyclic group, which groups may be substituted, or $R^{12}$ and $R^{13}$ together represent the necessary atoms to close a heterocyclic ring, which ring may be substituted, or $R^{12}$ and/or $R^{13}$ together with $R^{14}$ and/or $R^{17}$ represent the necessary atoms to close a ring fused-on the benzene ring, which ring may be substituted;

$R^{14}$, $R^{15}$, $R^{16}$ and $R^{17}$ (independently) represent hydrogen, hydroxy, halogen, an alkyl group, a cycloalkyl group, an aryl group, an alkyloxy group, an aryloxy group, a carbamoyl group, a sulfamoyl group, which groups may be subsituted, $NH-SO_2R^{18}$, $NH-COR^{18}$, $O-SO_2R^{18}$, $O-COR^{18}$, or $R^{14}$ and $R^{15}$ together and/or $R^{16}$ and $R^{17}$ together represent the necessary atoms to close (a) ring(s) fused-on the benzene ring or $R^{14}$ and/or $R^{17}$ together with $R^{12}$ and/or $R^{13}$ represent the necessary atoms to close a heterocyclic ring fused-on the benzene ring, which groups may be substituted;

$R^{18}$ represents an alkyl group, a cycloalkyl group, an alkenyl group, an aralkyl group, an aryl group, an alkyloxy group, an aryloxy group, an alkylthio group, an arylthio group, an amino group, a heterocyclic group, which groups may be substituted.

7. Thermal dye sublimation transfer method according to claim 6, wherein said dye has an absorption maximum above 700 nm.

* * * * *